T. G. HANEY.
COTTON BALING APPARATUS.
APPLICATION FILED JUNE 18, 1917.
1,255,160.
Patented Feb. 5, 1918.
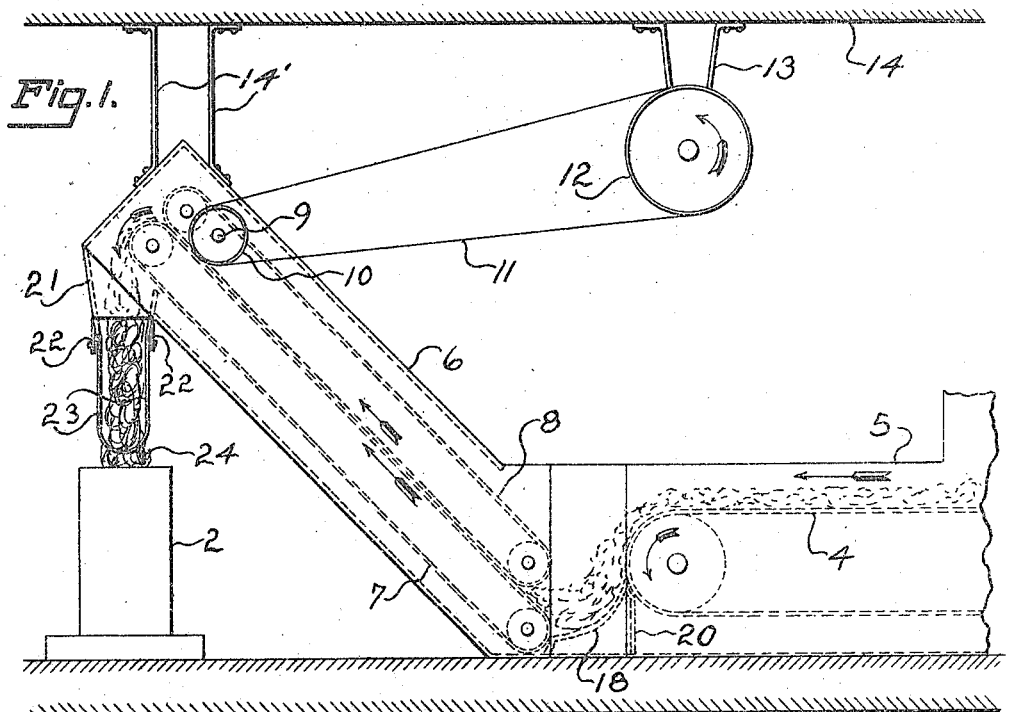
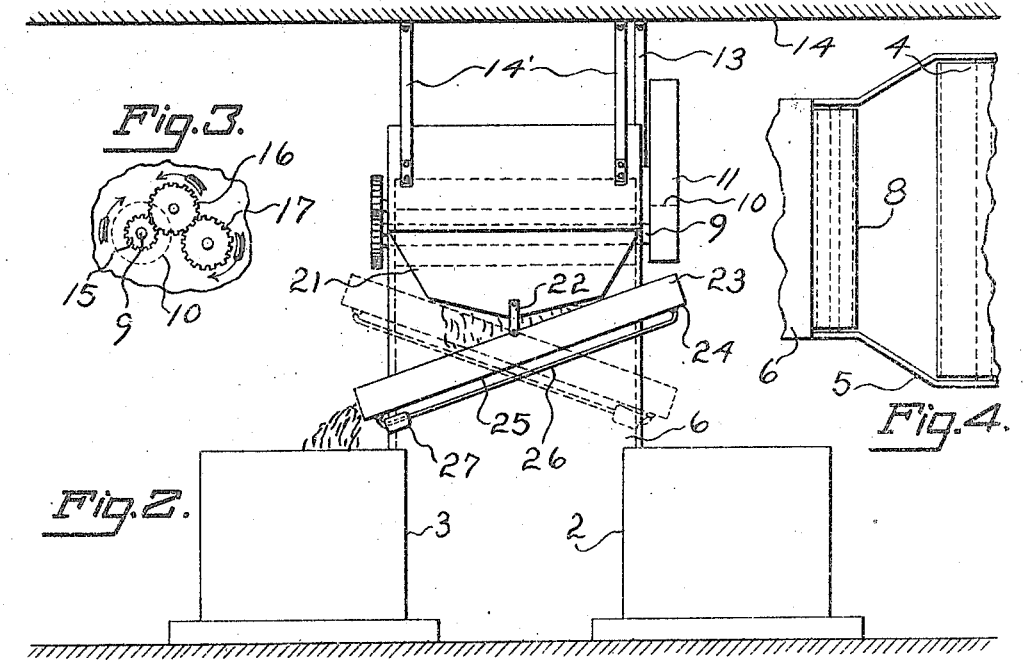
Inventor
T. G. Haney
By [signature]
Attorney

UNITED STATES PATENT OFFICE.

THOMAS G. HANEY, OF NEW LONDON, CONNECTICUT.

COTTON-BALING APPARATUS.

1,255,160.  Specification of Letters Patent.  Patented Feb. 5, 1918.

Application filed June 18, 1917. Serial No. 175,252.

*To all whom it may concern:*

Be it known that I, THOMAS G. HANEY, a citizen of the United States, residing at New London, in the county of New London and State of Connecticut, have invented certain new and useful Improvements in Cotton-Baling Apparatus, of which the following is a specification.

This invention relates to what I might for convenience term a cotton-baling apparatus. By the apparatus I can in an effective manner feed cotton to a battery of baling-presses to be quickly and properly baled thereby.

In the drawings accompanying and forming part of the present specification I have shown in detail one form of the apparatus involving the invention, which I will set forth in detail in the following description. I am not restricted, however, to this organization; I may depart therefrom in several respects within the scope of the invention defined by the claims following said description.

Referring to said drawings:

Figure 1 is a side elevation of apparatus involving the invention.

Fig. 2 is an elevation of the same as seen from the left in Fig. 1.

Fig. 3 is a detail of driving mechanism as seen from the left in said Fig. 2.

Fig. 4 is a top plan view of an intermediate part of feeding means.

Like characters refer to like parts throughout the several views.

As will be understood the primary motive I have in view is the delivery of cotton to a battery of baling-presses. While there may be any suitable number of these baling-presses to receive the cotton I have shown merely two in the drawings and have denoted them in a general way by 2 and 3 respectively. Each in itself is old and therefore requires no detailed description. I might note that the cotton is supplied in succession or in alternation to these baling presses 2 and 3. Cotton for instance is initially directed to the press 2, and when the requisite quantity has been received therein, it is given the usual baling treatment, and when this supply has been concluded, the cotton is delivered to the press 3 when the foregoing procedure will be repeated and so on. It is not necessary to describe the detailed construction of the baling-presses. This is quite familiar. The cotton is fed toward the presses by an endless carrier as 4, the upper run of which conducts the cotton in the direction of the arrow applied thereto. This carrier or conveyer 4 as shown is housed in a casing as 5 having an upward or forward angular extension 6, the bottom, sides and top of which are as shown closed in, and the said sides of which converge forwardly. In this extension or casing portion 6 are two endless and inclined carriers as 7 and 8, the lower and somewhat forward carrier 7 being slightly longer than the companion carrier 8. Both these carriers 7 and 8, although obliquely disposed have their inner runs in parallelism and adjacent to each other. They might be in contact but ordinarily they are slightly spaced apart. The upper end of the closed casing extension 6 sustains the shaft 9 carrying the band-wheel or pulley 10 connected by a belt as 11 with the driving pulley 12 which may be operated in any suitable manner and which turns in the direction of the arrow applied thereto. This pulley 12 and its shaft are sustained by a bearing as 13 fastened to and depending from the ceiling 14. To the ceiling are also connected the straps or hangers 14' connected to the upper end of the casing part 6 as shown. Through this casing the shaft 9 to which I have already referred extends, being projected through the opposite runs of the endless carrier or belt 8. To the back end of the shaft 9 is connected the pinion 15 in mesh with the spur gear 16 which in turn meshes with the spur gear 17, the gears 16 and 17 being connected with the upper or forward shafts of the two endless carriers or belts 7 and 8. In Fig. 3 I have indicated by arrows applied thereto, the directions of rotation of the various parts and in Fig. 1 I have shown by arrows the directions of motion of the inner and adjacent runs of the two endless carriers or belts 7 and 8. These runs as will be seen move upwardly and forwardly.

Between the carrier, conveyer or belt 4 and the coöperating carriers 7 and 8 is a directing-member such as the concaved plate 18, the upper end of which is fastened suitably to the wall member 20 and the base of which is united with the lower wall of the casing extension 6. The delivery end of this concaved plate or member 18, however, is in proximity to the receiving end of the lower belt 7. The cotton is discharged by the carrier or belt 4 onto the plate 18 and is taken up by the belt 7 which carries it forward sufficiently to permit it to be further advanced by the joint action of the two belts, the cotton being freed from the effect of the upper belt 8 before it is discharged by the lower belt 7 into the delivery hopper or chute 21 at the upper end of the casing extension 6.

The side walls and the front walls of the chute 21 converge downwardly. Although the lower edges of the side walls of the chute are parallel, the lower edges of the front and rear walls are on converging angles, the consequence being that the lowermost portions of the front and rear walls are below the lower edges of the side walls of the chute. The front and rear walls of the chute 21 have fastened centrally thereof the brackets or bearings 22 which extend below said walls and which are pivoted to the parallel walls 23 of the diverter 24. This diverter is longer than the width of the discharge chute 21, and obviously is suspended for oscillation. It comprises a bottom 25 and the side walls 23 to which I have already referred. To the bottom are fastened the upright arms of the elongated yoke 26, said arms being connected to the bottom near the ends thereof and practically centrally of the width of the bottom. The body of the yoke constitutes a support for the weight 27. It will be understood that the cotton is fed continuously by the joint action of the belt 4 and the two endless belts 7 and 8, the cotton leaving the lower of the two belts 7, entering the chute 21 and passing from this onto the bottom 25 of the oscillatory diverter 24. When the diverter is in the full line position shown in Fig. 2 it will be clear that the cotton passing from the diverter is discharged into the press 3. The weight 27 being at the left end of the body of the member 26 holds the diverter in the necessary position. When the press 3 has received the necessary quantity of cotton, the operator for instance by the manipulation of the yoke-like part 26, shifts the diverter to the dotted line position in Fig. 2 to direct cotton into the press 2, the weight 27 of course traveling by gravity as soon as the diverter has passed the central position. This action is continued so long as the supply of cotton is received.

What I claim is:

1. The combination of a plurality of baling presses, a chute above the baling presses, means for maintaining a supply of cotton to the chute, a member supported between its ends for oscillation by the chute, to receive cotton from the chute, and shiftable alternately to direct the cotton into the baling presses, and a weight associated with the member and slidable between positions at opposite sides of the center of motion of the member, and means for delivering a supply of cotton to the chute.

2. The combination of a plurality of baling presses, a chute above the baling presses, means for delivering a supply of cotton to the chute, a member supported between its ends for oscillation by the chute, to receive the cotton from the chute and shiftable alternately to direct the cotton into the baling presses, said member having upwardly extending side walls, and means associated with said member for automatically holding the same in a tilted position to direct cotton into one of the presses.

3. The combination of a plurality of baling presses, a chute above the baling presses, means for maintaining the supply of cotton to the chute, a member supported between its ends for oscillation by the chute, to receive the cotton from the chute and shiftable alternately to direct the cotton into the baling presses, a bail connected to the under side of the oscillatory member, near the ends thereof, and a weight slidable on said bail.

4. The combination of two coöperating and inclined endless conveyers, one of which is longer than the other, the inner runs of said conveyers being adapted to travel in the same direction approximately in parallelism, a concaved plate, one end of which is in proximity to the receiving end of the longer conveyer, means for supplying a body of cotton to said concaved plate, a chute to receive the cotton from the longer conveyer, and means for directing the cotton from the chute into baling means.

5. The combination of a chute having end and side walls which converge downwardly, a diverter comprising a bottom and sides, the sides of the diverter being pivoted to the sides of the chute approximately midway of the length of the diverter to thus permit oscillation of the diverter, separate receiving parts into which material is alternately directed by the diverter, and means for holding the diverter in its respective shifted positions.

In testimony whereof I affix my signature in the presence of two witnesses.

THOMAS G. HANEY.

Witnesses:
LOUIS B. MEYER,
JASPER P. HASKELL.

Copies of this patent may be obtained for five cents each, by addressing the "Commissioner of Patents, Washington, D. C."